(12) United States Patent
Leslie

(10) Patent No.: US 11,444,556 B1
(45) Date of Patent: Sep. 13, 2022

(54) PIEZOELECTRIC ELECTRIC ENERGY GENERATING DEVICE

(71) Applicant: John M. Leslie, Blountville, TN (US)

(72) Inventor: John M. Leslie, Blountville, TN (US)

( * ) Notice: Subject to any disclaimer, the term of this patent is extended or adjusted under 35 U.S.C. 154(b) by 505 days.

(21) Appl. No.: 16/501,178

(22) Filed: Mar. 1, 2019

Related U.S. Application Data

(60) Provisional application No. 62/710,853, filed on Mar. 1, 2018.

(51) Int. Cl.
*H02N 2/00* (2006.01)
*H02N 2/18* (2006.01)
*H04R 17/00* (2006.01)

(52) U.S. Cl.
CPC ............. *H02N 2/186* (2013.01); *H04R 17/00* (2013.01)

(58) Field of Classification Search
CPC ....................................................... H02N 2/00
See application file for complete search history.

(56) References Cited

U.S. PATENT DOCUMENTS

| | | | | |
|---|---|---|---|---|
| 3,101,422 A | * | 8/1963 | Church | G01F 23/2967 310/26 |
| 4,441,044 A | * | 4/1984 | Ruckenbauer | G01L 23/10 310/329 |
| 2007/0228874 A1 | * | 10/2007 | Nagaya | H01L 41/1873 310/315 |
| 2011/0290584 A1 | * | 12/2011 | Sato | B06B 1/0644 181/211 |
| 2014/0117812 A1 | * | 5/2014 | Hajati | H01L 41/331 310/314 |
| 2014/0327340 A1 | * | 11/2014 | Tsurumi | G01L 23/10 310/338 |
| 2017/0094418 A1 | * | 3/2017 | Clerici | H04R 23/02 |

\* cited by examiner

*Primary Examiner* — Olisa Anwah
(74) *Attorney, Agent, or Firm* — John Wood; Wood Patent Law

(57) ABSTRACT

An electrical current generating device having a sound wave force magnifying structure in the form of a force transmission pin which is longitudinally slidable within a body bore and having a proximal end of a large area for receiving sound wave forces, and having a greatly reduced area distal end which bears on a piezoelectric element.

6 Claims, 7 Drawing Sheets

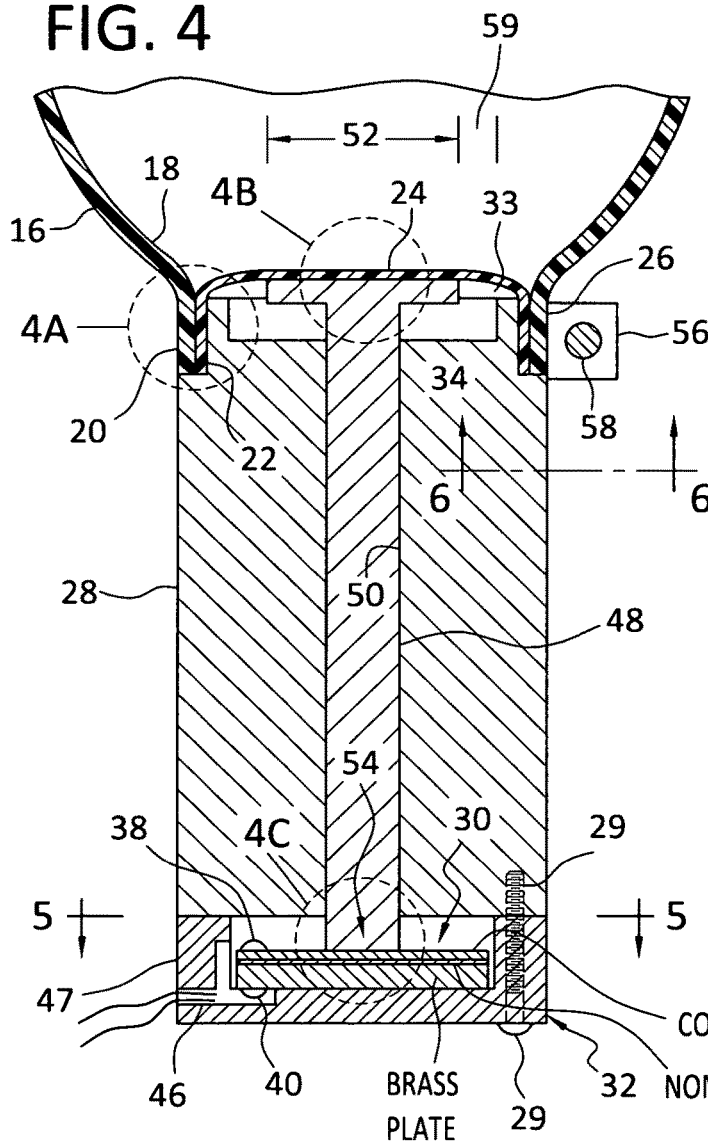
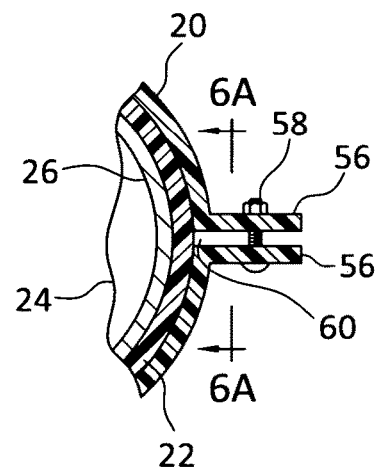
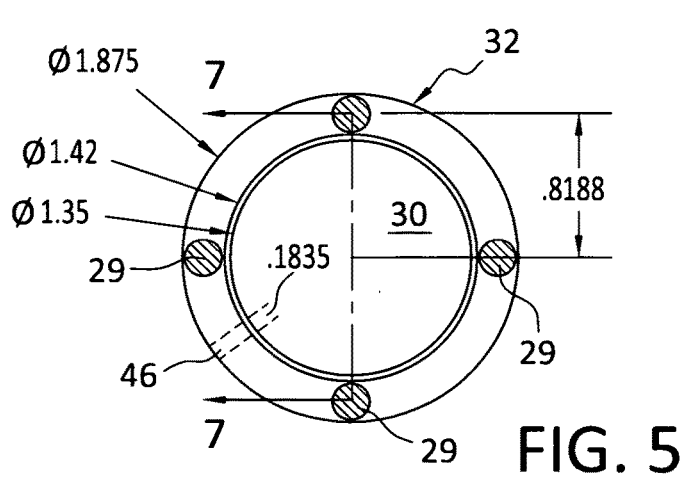
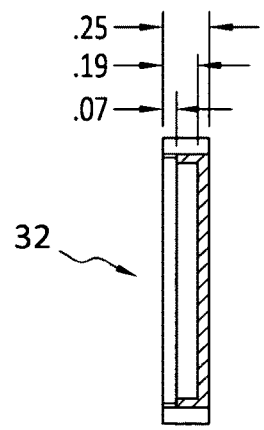

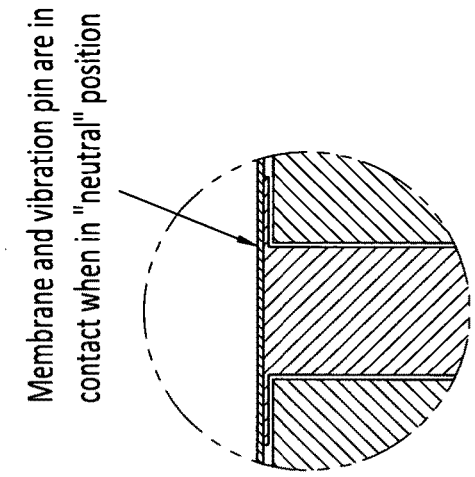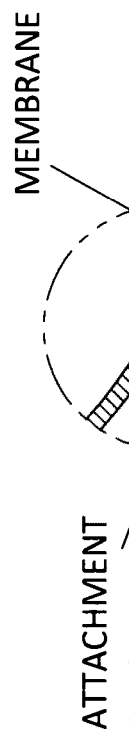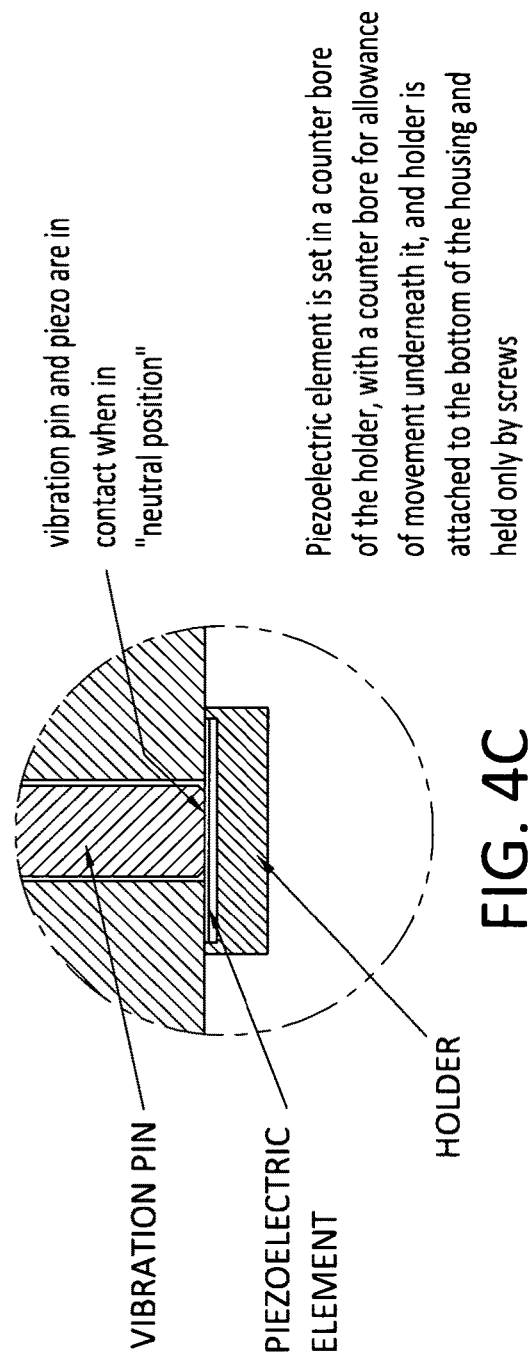

FIG. 4A — MEMBRANE, ATTACHMENT RING. Membrane is stretched over housing and held in place by the bottom attachment ring of the "sound capturing cone" with a counter bore in housing underneath for allowance of movement FIG. 4B — Membrane and vibration pin are in contact when in "neutral" position FIG. 4C — VIBRATION PIN, PIEZOELECTRIC ELEMENT, HOLDER. vibration pin and piezo are in contact when in "neutral position". Piezoelectric element is set in a counter bore of the holder, with a counter bore for allowance of movement underneath it, and holder is attached to the bottom of the housing and held only by screws

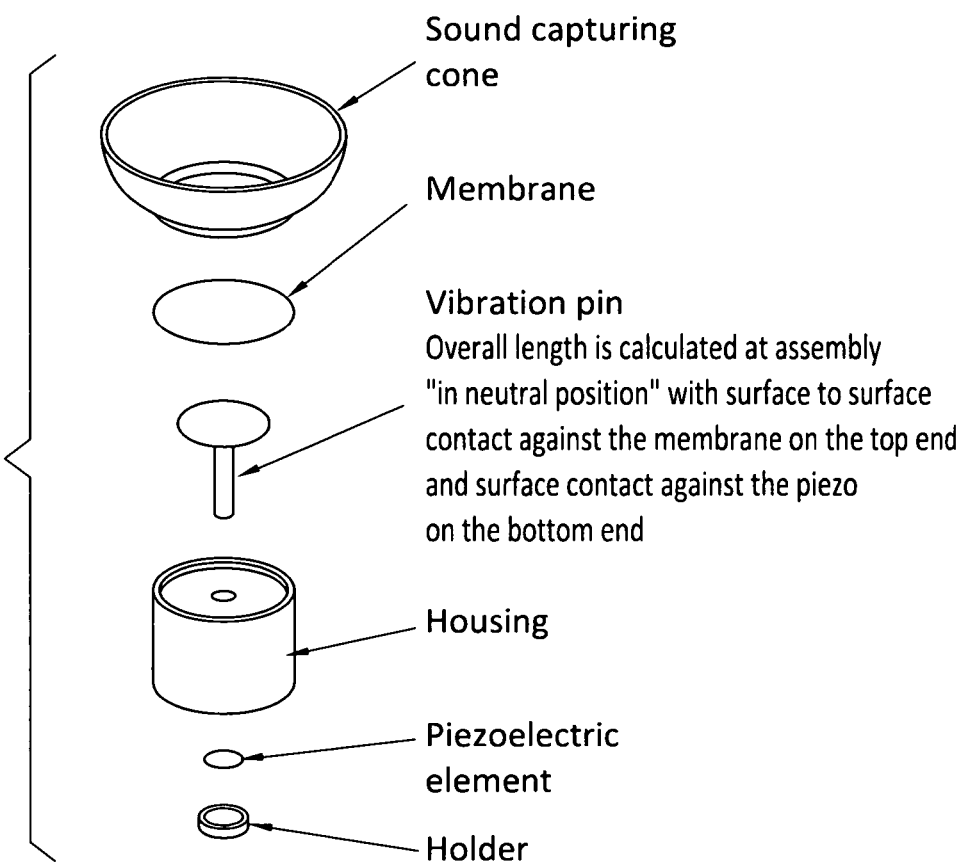

PIEZOELECTRIC ELECTRIC ENERGY GENERATING DEVICE

This application is a complete application for Applicant's Provisional Application Ser. No. 62/710,853 filed Mar. 1, 2018, the benefit of which applicant hereby claims.

BACKGROUND

The present invention resides in the construction of a device having an electricity generating Piezoelectric element, and a wave collection and wave force magnifying structure whereby waves from any source including mechanically generated or naturally occurring, e.g., wind, water, weight, and particularly sound waves of very small to very large decibel force magnitudes can provide the electricity generating forces. The device is particularly useful in small to miniature dimensions for carrying, for example, in a vehicle or on one's person and electrically connected to a cell phone battery charger or the like.

SUMMARY OF THE INVENTION

A device responsive to wave forces, particularly sound wave forces and constructed to apply said forces to a Piezoelectric element to generate an electric current, wherein, e.g., sound wave force magnifying structure is provided in the form of a pressure pin having an enlarged area proximal head surface which receives, sound wave forces, and a greatly reduced area distal pressure end surface which bears against a piezoelectric element for transmitting resultant magnified sound wave forces thereto.

The following describes a working device that has proved to work successfully. This device uses the forces of sound waves to convert them into voltage and electricity that can perform work in A.C. or D.C. mode.

The following description of the device will use the following terms:
1. "Cone"=A sound capturing detail of the mechanism.
2. "Housing"=A body that contains and is attached to all details of the mechanism.
3. "Membrane"=A flexible substrate that vibrates when the sound waves impact it.
4. "Membrane Disc"=When used is a solid rigid component that is fastened to the flexible "Membrane".
5. "Vibration Pin"=A pin that moves inside the "Housing" and creates pressure on a Piezoelectric element.
6. "Piezoelectric Element"=A form of Piezoelectric material including but not limited to copper, quartz, brass, zirconium-titanium compounds, lead zirconate, calcium titanate, cane sugar, Rochelle salt, tourmaline, bone, lithium niobite, gallium arsenide, zinc oxide, aluminum, etc. This, in lay terms, is any element or material/materials that have Piezoelectric (pressure electric) properties.
    a) In operation, sound waves are captured by the "Cone";
    b) Sound waves then impact the "Membrane" of flexible, rubbery material which also can carry a central segment (Membrane Disc) of very light weight rigid material including metal adhesively or mechanically secured to the membrane or molded into the membrane;
    c) The "Vibrating Membrane" impacts the head of the "Vibration Pin" which then in turn vibrates the "Vibration Pin" against the "Piezoelectric Element" and creates voltage/current proportional to the vibration magnitude of the "Membrane". Lower frequencies of sound create more force;
    d) Conclusion: This device successfully created up to 3.2 volts of current in the manner described above. When subjected to 175-225 dB sound waves. It was found that a centrally located metal reinforced portion "Membrane Disc" of the "Membrane" was particularly effective in creating such voltage by providing a solid (substantially non-flexible) surface to depress the "Vibration Pin". This voltage is captured by the connection of positive and negative lead wires to the "Piezoelectric Element".

BRIEF DESCRIPTION OF THE DRAWINGS

The present invention is further explained by the drawings herein wherein the various figures are not drawn to scale or in consistent structural proportions, wherein:

FIG. 4 is a cross-sectional view taken along line 4-4 in FIG. 1;

FIGS. 4A, 4B and 4C are taken from the dotted encircled areas of FIG. 4;

FIG. 5 is a cross-sectional view taken along line 5-5 in FIG. 4;

FIG. 6 is a cross-sectional view taken along line 6-6 in FIG. 4;

FIG. 6A is a cross-sectional view taken along line 13-13 in FIG. 6;

FIG. 7 is a cross-sectional view taken along line 7-7 in FIG. 5;

FIG. 10 is an exploded explanatory assembly view of the basic components of the present device.

DETAILED DESCRIPTION OF THE DRAWINGS

Figure 1:
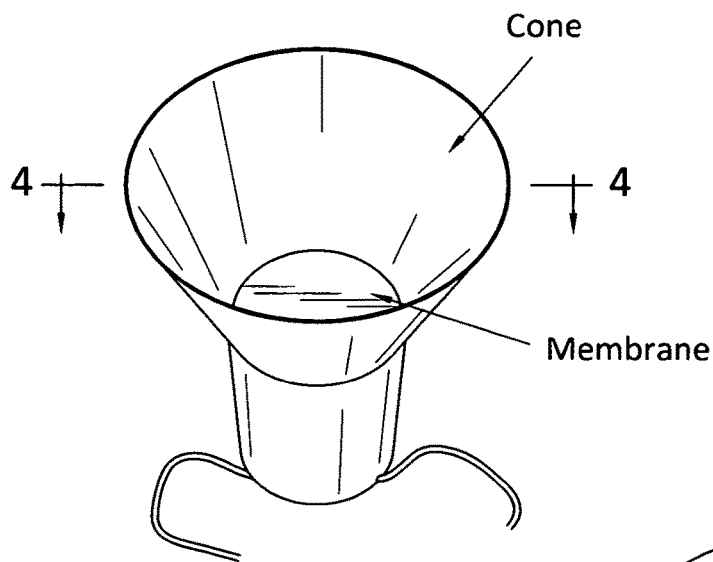
FIG. 1 is a cone end perspective view of the present electricity generating device wherein the sound responsive membrane and the pressure pin are in their neutral positions.
Figure 2:
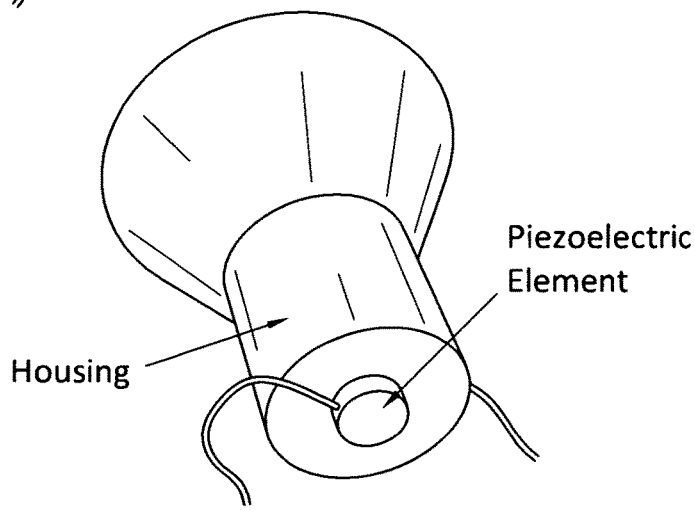
FIG. 2 is a piezoelectric element end perspective view of the present electricity generating device.
Figure 3:
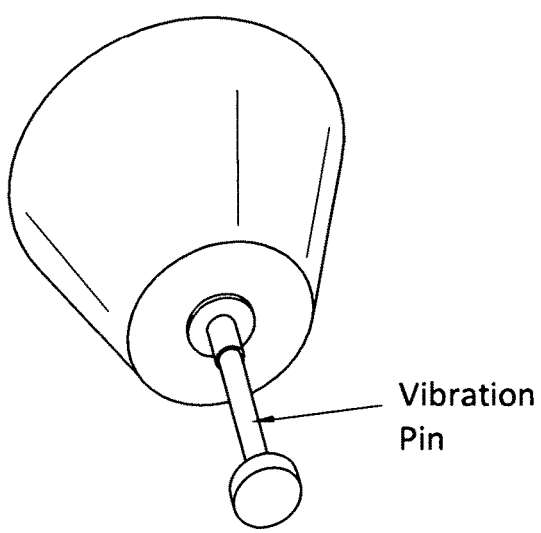
FIG. 3 is a view as in FIG. 2 with the housing removed.
Figure 3A:
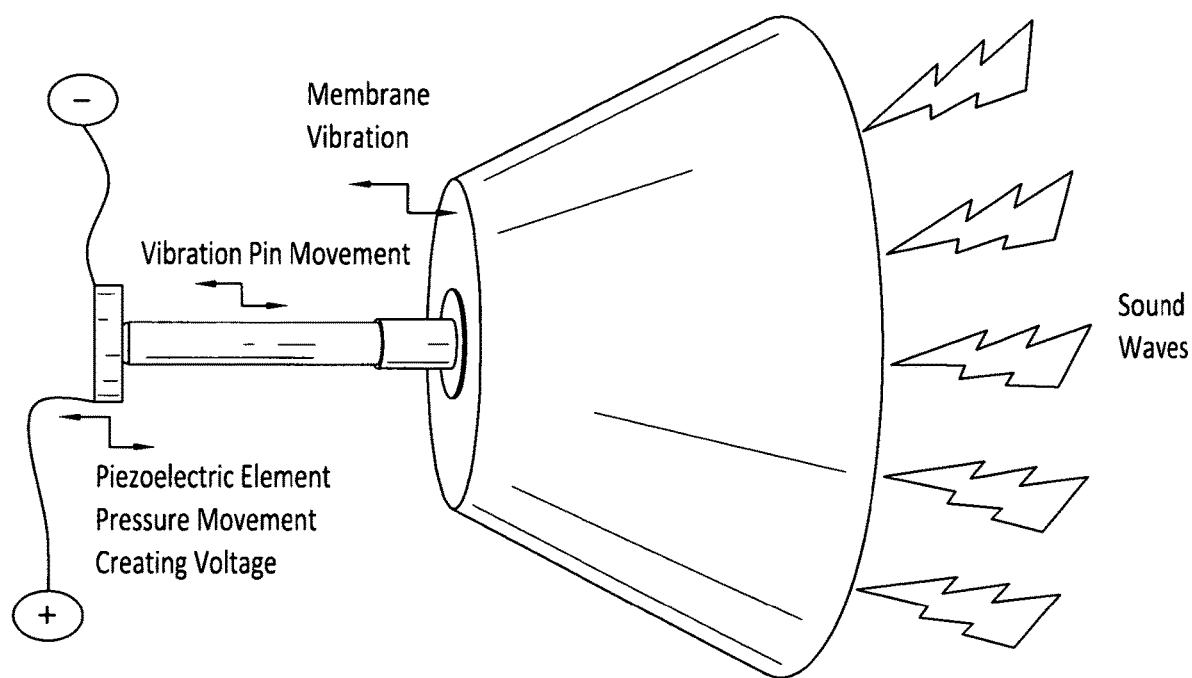
FIG. 3A is a side view of the isolated cone, vibration pin and piezoelectric element components of the present device.
Figure 8:
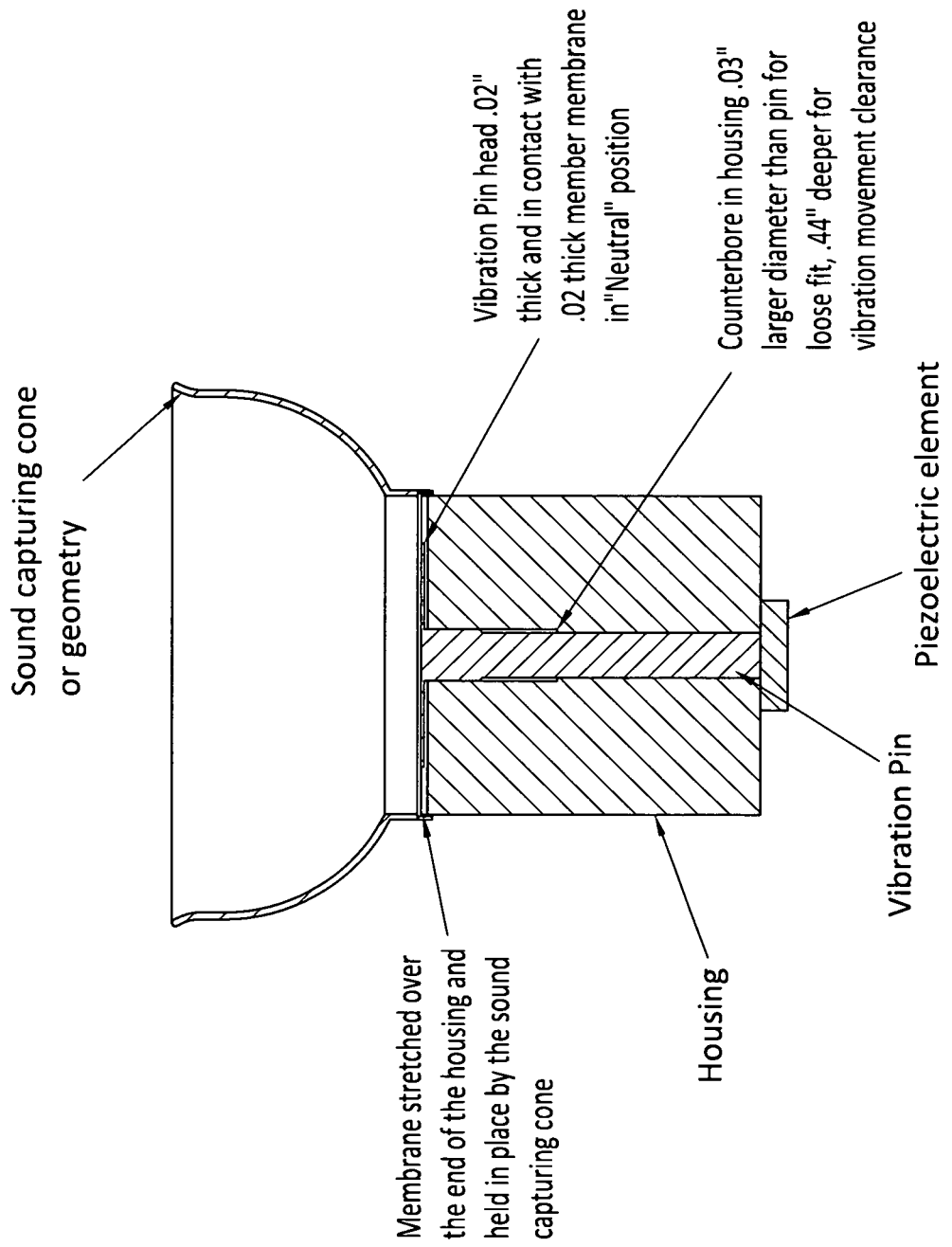
FIG. 8 is a cross-sectional view without the piezo element housing.
Figure 9:
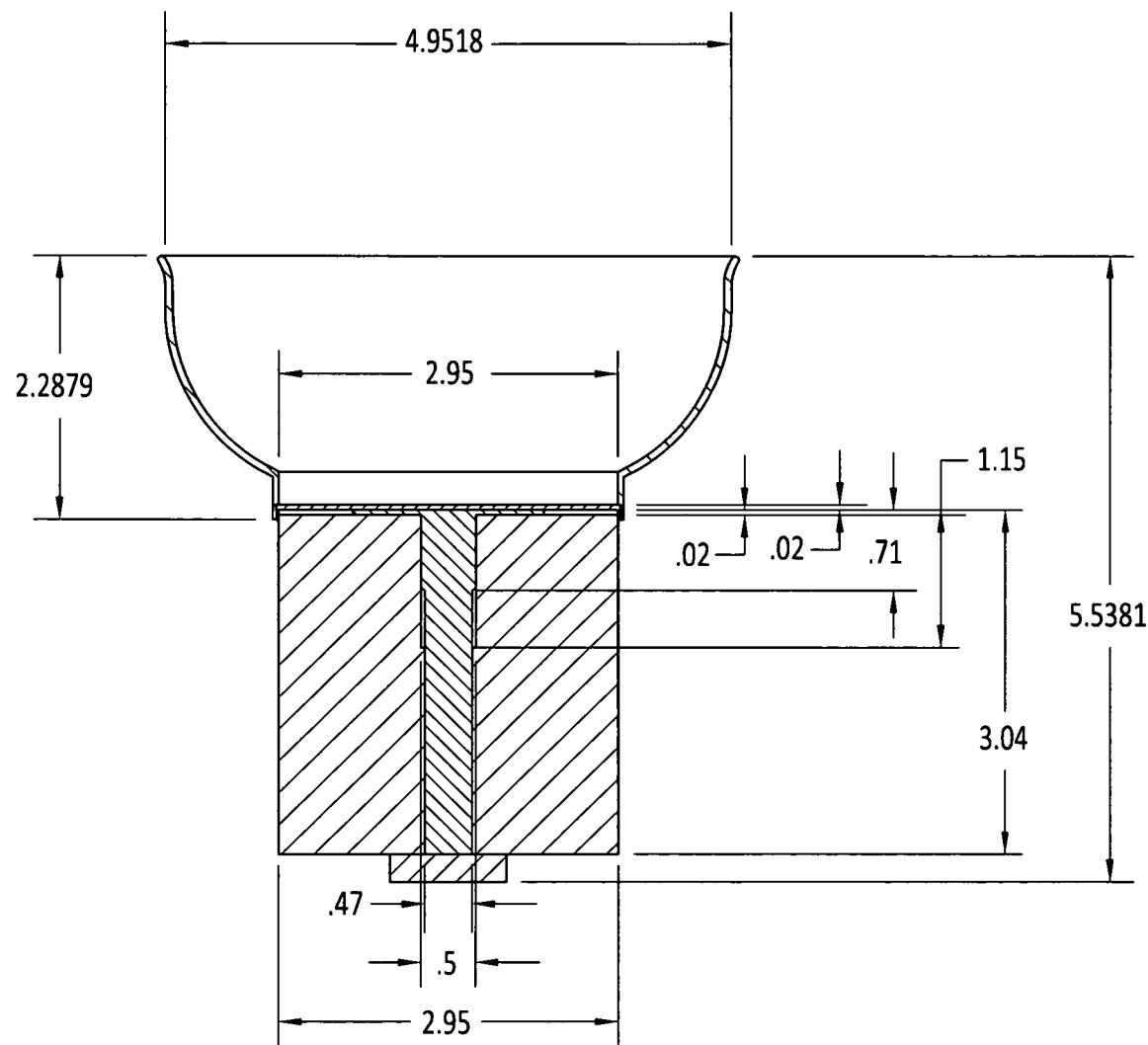
FIG. 9 is a cross-sectional view as in FIG. 8 showing typical dimensions given in inches.

As shown in the drawings, the basic structure of the present device comprises a generally cone shaped sound wave cylindrical funneling structure 16, which from the constricted end 18 thereof depends a cylindrical mounting sleeve 20 which is slidable over but frictionally secured to a circular peripheral rim portion 22 of a flexible membrane 24 by being tightly sandwiched against a circular surface 26 of body member 28. This tightening structure preferably comprises a gap 60 vertically formed in sleeve 20 and tabs 56 molded to sleeve 20 and provided with bolt 58 which when tightened draws the gapped sleeve tightly around membrane rim 22 and surface 26 of body member 28.

A piezoelectric element 30 is affixed in and to a holder 32 at the base 36 of the holder. The holder is secured to a body member 28 by screws 29. The piezoelectric element may consist of any of a wide variety of materials that are responsive to pressure for generating electrical current and include, for example quartz, brass, zirconate compounds, titanium, Pb zirconate, Ca titanate, and is provided with 38 and 40 terminals wherein their lead conductors 42 and 44 respectively extend from the terminals to the exterior of the holder 32 through a channel such as 46 formed in a wall 47 of said holder.

A vibration pin 48, preferably of lightweight material, preferably plastic, is slidably mounted in bore 50 with clearance sufficient to offer negligible resistance to its axial reciprocation within said bore. It is particularly noted the head area 52 of the pin is markedly enlarged relative to the distal end area 54 of the pin, thereby magnifying the pressure which the sound waves exert upon the piezoelectric element. A ratio of about 2/1 to about 20/1 of the pin head area to the distal end area of the pin is preferred for the smaller devices. Most preferably the top surface of the pin head is slightly e.g., 0.001-0.008 in. above the top circular surface 33 of top body rim 34.

Membrane 24 is comprised of any of a wide variety of highly flexible materials such as natural or synthetic rubbers or synthetic elastomers, whereby very light sound wave forces can cause the circumferential flex area 58 of the membrane to deform and bring the membrane into forcible contact with head 52 of said pin.

A preferred, but not limited to, list of component materials is as follows:

- "Sound Collection "Cone" (16)—polylactic acid or polylactide (PLA) which is a biodegradable and bioactive thermoplastic aliphatic polyester;
- "Membrane" (24)—0.8 MM thick Polyurethane;
- "Vibration Pin" (48)—PLA (Poly Lactic Acid);
- "Piezoelectric Element" (30)—0.5 MM thick by 32 MM Diameter C23000 Brass which is an alpha brass having only one phase crystalline structure. This crystalline structure is "Face Centered Cubic Crystal Structure" on the molecular level;
- "Housing" or "Body Member" (28) and "Holder" (32)—Acetal copolymers having high tensile and flexural strength, fatigue resistance, hardness and excellent lubricity is excellent. These plastics retain much of their toughness through a broad temperature range and are among the most creep resistant of the thermoplastics.

I claim:

1. An electrical current generating device comprising a body with a top end surface and a bottom end surface, a shaft bore formed around a longitudinal axis of said body and extending through said end surfaces, said end surfaces lying in parallel planes which are perpendicular to said axis, said top end surface being formed with a rim wall centered around said axis and extending substantially axially therefrom, wherein said rim wall has a distal top surface lying in a plane parallel to said planes of said end surfaces, a holder affixed to said body against said bottom end surface and having a wall portion defining a cavity facing said bottom end surface, a piezoelectric element affixed in said cavity and having a pressure receiving portion exposed to said bore, a vibration pin having a shaft portion slidably mounted in said bore and having a distal end lightly engaging said pressure receiving portion of said piezoelectric element, said shaft portion further having a disc shaped head having a planar pressure face and being formed on a proximal end of said shaft portion, wherein said pressure face is spaced above said distal top surface of said rim wall, a flexible membrane overlying said pressure face and said distal top surface, a generally conically shaped funnel structure affixed to said upper end portion of said body for funneling energy waves onto said membrane, clamping structure on said body and said funnel structure affixing said membrane to said body, and positive and negative wiring affixed to said piezoelectric element and extending out of said cavity thru a channel formed through said wall portion of said holder.

2. The device of claim 1 wherein said vibration pin is comprised of lightweight plastic material.

3. The device of claim 2 wherein the ratio of the horizontal area of said pressure face to the area of said distal end of said shaft portion of said pressure pin is from about 2/1 to about 20/1.

4. The device of claim 1 wherein said piezoelectric element is composed of brass.

5. The device of claim 1 wherein said pressure face of said head is spaced above said distal of said rim wall a distance of from about 0.001 in. to about 0.008 in.

6. The device of claim 2 wherein said plastic material is polylactic acid polymer.

* * * * *